March 19, 1935.  E. F. HOFFMAN  1,995,123
MEAT TENDERING MACHINE
Filed Sept. 16, 1932
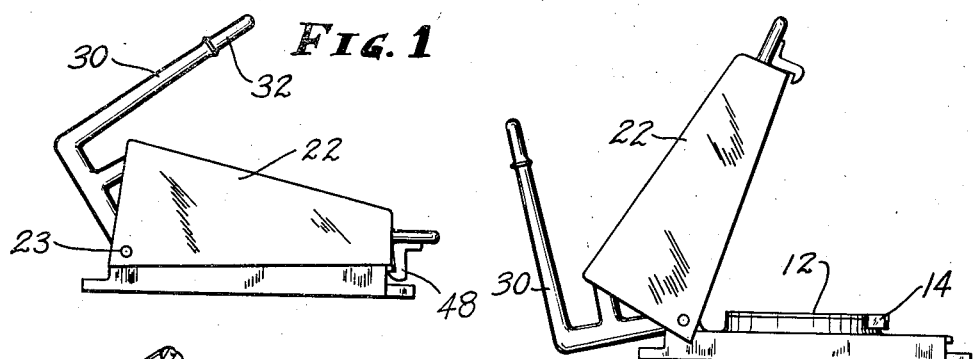
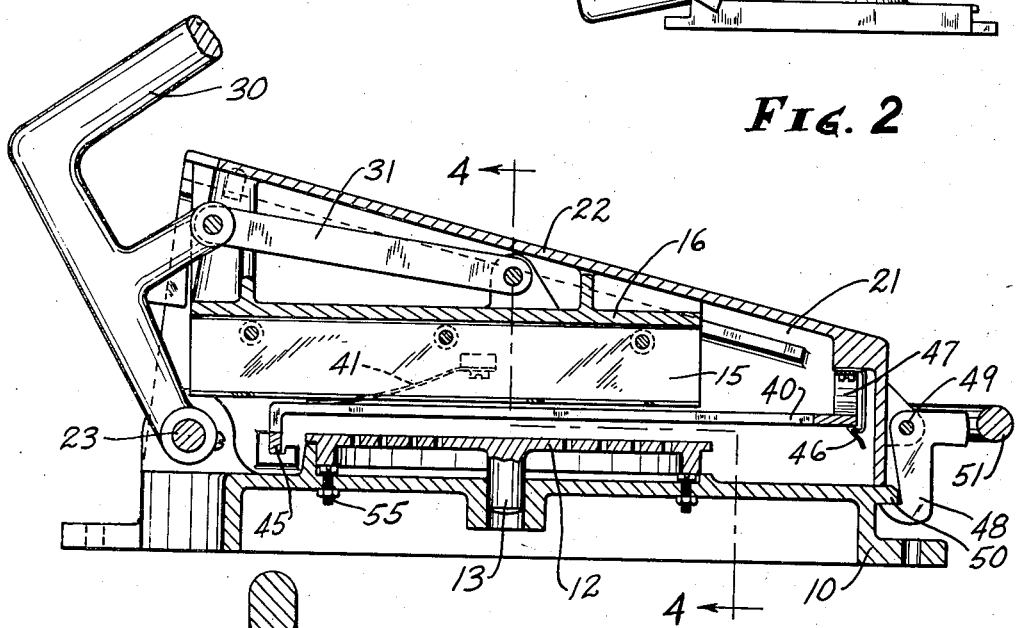
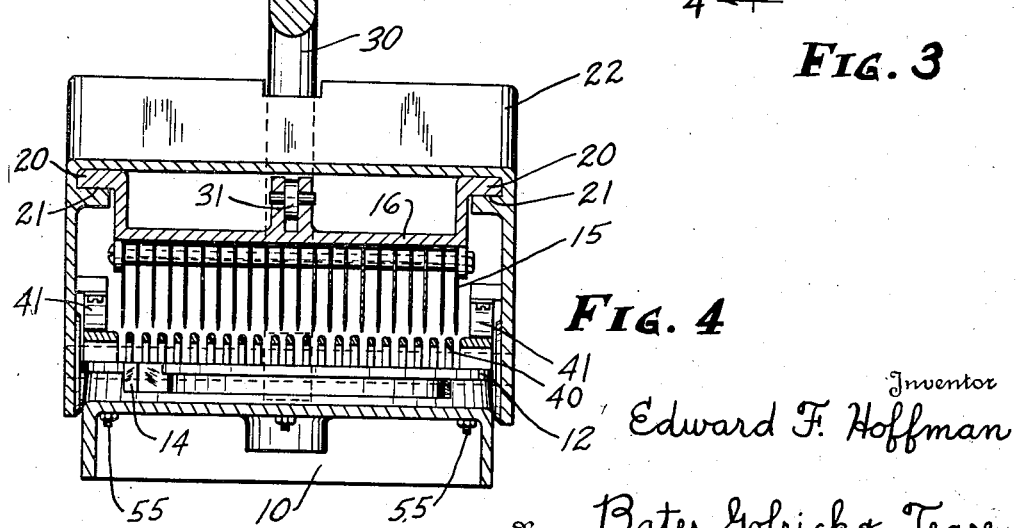
Inventor
Edward F. Hoffman
By Bates, Goldrick & Teare
Attorneys Patented Mar. 19, 1935

1,995,123

UNITED STATES PATENT OFFICE 1,995,123

MEAT-TENDERING MACHINE

Edward F. Hoffman, Shaker Heights, Ohio, assignor to Mary A. Hoffman, Shaker Heights, Ohio.

Application September 16, 1932, Serial No. 633,486

7 Claims. (Cl. 17—25)

This invention relates to a meat tendering device, such as is used for slitting steaks into cubes, so as to make them more tender. Heretofore, an effort has been made to effect such action by the use of rollers, which were drawn across the meat, but I have found that the meat instead of being cut cleanly, is packed under the rollers and is torn, rather than cut. This leaves a jagged appearance, which is objectionable to the sale of the meat.

An object of my invention therefore, is to provide a machine, which will effect a clean and accurate cut in a relatively small degree of movement of the cutting member, and which is extremely simple in construction, and therefore, capable of being economically manufactured. A further object of my invention is to provide a device which may be quickly disassembled for cleaning purposes and which possesses a relatively small number of parts.

Referring now to the drawing, I have shown a device embodying my invention, wherein Fig. 1 is a side elevation with the device closed and ready for operation; Fig. 2 is a similar elevation showing it open and in position for receiving the meat; Fig. 3 is a longitudinal vertical section through the device; and Fig. 4 is a section taken on the line 4—4 in Fig. 3.

My invention contemplates the use of a plurality of knives, which are moved diagonally across the meat, and which effect the desired cutting action by a relatively small degree of movement. To this end, I have shown the invention as embodied in a base or bed 10, which has provision for receiving a meat supporting table 12. This table is illustrated as having a swivel connection at 13 with the base, by means of which it can be turned against stops through an angle of 90 degrees, for enabling the meat to be cut at right angles, thus resulting in the desired cube formation. A finger tab 14 on the plate (shown in Fig. 2) enables it to be turned to the desired degree at the completion of the first cutting operation.

The cutting elements comprise a plurality of blades 15 of relatively thin, preferably rectangular strips of metal, which are rigidly mounted in spaced relationship upon a carrier 16. The carrier has laterally extending portions 20, which extend into and are slidably mounted in guideways 21 in a housing 22, which may be pivotally mounted at 23 on the base. The guideways as shown are inclined to the plane of the plate 12, while the cutting edges of the blades are disposed in substantially parallel relationship to the plane of the plate. Thus, as the blade carrier is reciprocated in the housing, the blades move downwardly and forwardly across the meat.

To move the carrier, I have shown an operating lever 30, which may be pivotally mounted at 23 on the base, and which may be connected to the carriage by a link 31, as is shown in Fig. 3. The outer end of the lever is provided with a handle 32 by means of which it may be operated.

To hold the meat on the bed, I have shown a slotted rack 40, which extends lengthwise of the housing, and which rests thereon at 45 and is yieldingly held thereagainst by springs 41 as shown in Figs. 3 and 4. The forward end of the rack is held in place preferably by means of a yieldable latch 46, and is held against the latch by another yieldable member, such as a leaf spring 47. During the cutting operation, the housing may be held against the base by means of a gravity actuated latch 48, which is pivotally mounted at 49 on the housing, and which is adapted to engage a shoulder 50 on the base. A suitable handle 51 on the housing enables it to be lifted to insert or adjust the meat.

The operation of the device is as follows:— The latch 48 is opened, and the housing is swung about the pivot 23 from the position shown in Fig. 1 to that shown in Fig. 2. A steak is then placed on the plate 12, whereupon the housing is lowered and is pressed downwardly until the latch 48 locks it to the base. Prior to such time, the carrier is in its retracted position with the blades above the rack 40, at which time the lever 30 occupies the position shown in Fig. 1. Thereupon, the lever is pressed downwardly, thus moving the knife carrier forwardly and slitting the steak. The depth of the blades and the path of travel of the carrier are so proportioned that the meat is not cut entirely therethrough. This leaves a relatively thin strip for holding the sliced portions together. To this end the relationship may be further controlled by adjusting screws 55, which enable the vertical position of the plate 12 with reference to the base to be controlled.

At the completion of the slicing operation, the handle is released to its normal position, the carrier is raised and the plate is turned through an angle of 90 degrees. Thereupon, the housing is closed and the slicing operation is repeated. This completes the cube forming operation.

From the foregoing description, it will be apparent that my invention provides a device, wherein the meat is sliced by a downward and forward motion of the cutter, thus resulting in a clean and efficient cut. Furthermore, it will be apparent that the device contains a relatively small number of parts, and that it can therefore, be easily and readily cleaned.

I claim:

1. In a device for tendering meat, the combination with a bed, of a knife carrier movable toward and from the bed, a plurality of flat-edged cutting knives, and means for moving the knives in the carrier downwardly and forwardly toward the bed to a predetermined position above the bed while maintaining the cutting edges parallel to the plane of the bed, the forward component of the knife motion being greatly in excess of the downward component.

2. In a device for tendering meat, the combination with a bed, of a housing pivotally mounted thereon, a plurality of flat-edged cutting knives mounted for reciprocation on the housing and means for reciprocating the knives downwardly and forwardly with reference to the bed to a predetermined position above the bed, while maintaining the cutting edges parallel to the plane of the bed, the forward component of the knife motion being greatly in excess of the downward component.

3. In a device for tendering meat, the combination with a bed, of a housing pivoted thereon, said housing having a guideway inclined to the bed, a knife carrier slidably mounted within the guideway, cutting knives positioned on the carrier, and a lever pivoted on the bed on the same pivot as the housing, and projecting above the housing for reciprocating the carrier with reference to the housing, whereby the knives are adapted to be reciprocated within the housing.

4. In a meat tendering device, the combination with a bed, of a housing pivotally mounted thereon and having a guideway therein inclined to the plane of the bed, a knife carrier slidable in the guideway, cutting knives positioned on the carrier, a lever pivoted on the bed and extending beyond the top of the housing, and a link connecting the lever to the carrier, whereby the knives are moved vertically and horizontally with reference to the bed, and whereby the horizontal component of the motion is in excess of the vertical component.

5. In a meat tendering device, the combination with a bed, of a housing pivotally mounted thereon, and having a guideway therein inclined to the plane of the bed, a knife carrier slidable within the guideway, a plurality of rectangular cutting knives positioned on the carrier and each having the cutting edge thereof disposed substantially parallel to the plane of the meat supporting surface of the bed, a manually operable lever projecting above and forwardly of the housing for substantially the full length thereof, means within the housing for operatively connecting the lever to the carrier, and a meat engaging rack yieldably supported within the housing and having slots through which the knives are adapted to pass during a cutting operation.

6. In a meat tendering device, the combination with a bed, of a housing pivoted thereto and adjacent one end thereof, a latch connecting the opposite end of the housing to the bed, said housing having a guideway therein inclined to the plane of the meat supporting surface of the bed, a knife carrier mounted for reciprocation within the guideway, cutting knives positioned on the carrier and each comprising a rectangular strip of relatively thin metal, and the cutting edges of all of said knives being disposed within the same plane and substantially parallel to the meat supporting surface of said bed, whereby movement of the carrier with reference to the housing moves the cutting edges of the blades downwardly and laterally with reference to the bed, a slotted meat engaging rack removably supported within the housing, a lever mounted on the housing pivot and projecting above the housing, and a link connecting the lever to the carrier.

7. In a device for tendering meat, the combination with a bed, of a housing pivotally mounted thereon, a plurality of flat edged cutting knives, means for reciprocating the knives within the housing and with reference to the bed, said means being operative to move the knives simultaneously with a downward and forward movement to a predetermined position above the bed, while maintaining the cutting edges parallel to the plane of the bed, the forward component of the knife motion being greatly in excess of the downward component.

EDWARD F. HOFFMAN.